United States Patent
Lee et al.

(10) Patent No.: US 9,236,925 B2
(45) Date of Patent: Jan. 12, 2016

(54) METHOD AND APPARATUS OF LINK ADAPTATION IN A WIRELESS LOCAL AREA NETWORK SYSTEM

(75) Inventors: Dae Won Lee, Anyang-si (KR); Byeong Woo Kang, Anyang-si (KR); Yong Ho Seok, Anyang-si (KR); Dong Wook Roh, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 117 days.

(21) Appl. No.: 13/996,782
(22) PCT Filed: Dec. 22, 2011
(86) PCT No.: PCT/KR2011/010015
§ 371 (c)(1),
(2), (4) Date: Jun. 21, 2013
(87) PCT Pub. No.: WO2012/087054
PCT Pub. Date: Jun. 28, 2012

(65) Prior Publication Data
US 2013/0294397 A1   Nov. 7, 2013

Related U.S. Application Data

(60) Provisional application No. 61/425,763, filed on Dec. 22, 2010, provisional application No. 61/427,205, filed on Dec. 27, 2010.

(51) Int. Cl.
*H04W 4/00* (2009.01)
*H04B 7/06* (2006.01)
*H04L 1/00* (2006.01)

(52) U.S. Cl.
CPC .............. *H04B 7/063* (2013.01); *H04L 1/0025* (2013.01); *H04L 1/0027* (2013.01)

(58) Field of Classification Search
CPC .......... H04W 72/042; H04W 72/0453; H04W 72/0406; H04L 5/0053; H04L 5/0055; H04B 1/707; H04B 7/2628; H04B 2201/70702; H04J 13/00; H04J 13/18

USPC ................. 455/186.1, 69; 370/471, 252, 441
See application file for complete search history.

(56) References Cited

U.S. PATENT DOCUMENTS

2005/0195733 A1*  9/2005  Walton et al. ................. 370/208
2006/0268886 A1   11/2006  Sammour et al.
(Continued)

FOREIGN PATENT DOCUMENTS

| WO | WO 2007/064710 A2 | 6/2007 |
| WO | WO 2007/114804 A1 | 10/2007 |
| WO | WO 2008/002972 A2 | 1/2008 |
| WO | WO 2012/030585 A2 | 3/2012 |

OTHER PUBLICATIONS

IEEE Computer Society, "IEEE Standard for Information technology . . . Part 11: Wireless LAN Medium Access Control (MAC) and Physical Layer (PHY) Specifications; Amedment 5: Enhancements for Higher Throughput", IEEE Std 802.11 n, XP-55202097A, Oct. 29, 2009, pp. 1-8.
(Continued)

*Primary Examiner* — Andrew Chriss
*Assistant Examiner* — Atique Ahmed
(74) *Attorney, Agent, or Firm* — Birch, Stewart, Kolasch & Birch, LLP

(57) ABSTRACT

A method of transmitting modulation and coding scheme (MCS) feedback (MFB) in a wireless local area network system is provided. The method is performed by a first station and includes receiving, from a second station, a physical layer convergence procedure (PLCP) protocol data unit (PPDU), estimating a MFB based on the PPDU and transmitting, to the second station, feedback information including a MFB field and a MFB type field. The MFB field includes the MFB and the MFB type field indicates whether or not the MFB is in response to a MFB request (MRQ) of the second station.

15 Claims, 8 Drawing Sheets

(56) References Cited

U.S. PATENT DOCUMENTS

| | | | | |
|---|---|---|---|---|
| 2007/0129018 A1* | 6/2007 | Trainin | ............... | H04L 1/0026 455/69 |
| 2007/0195811 A1* | 8/2007 | Basson et al. | ................. | 370/441 |
| 2007/0298742 A1* | 12/2007 | Ketchum et al. | ............ | 455/186.1 |
| 2008/0014870 A1* | 1/2008 | Kim | ................ | 455/69 |
| 2012/0020261 A1* | 1/2012 | Van Zelst et al. | ............ | 370/310 |
| 2012/0051246 A1* | 3/2012 | Zhang et al. | ................. | 370/252 |
| 2013/0010632 A1* | 1/2013 | Wang et al. | .................. | 370/252 |

OTHER PUBLICATIONS

Merlin et al., "VHT Control and Link Adaptation", IEEE 802.11-11/0040r0, XP-68035411A, Jan. 18, 2011, 16 pgs.

Stacey et al., "Proposed TGac Draft Amendment" IEEE P802.11 Wireless LANs, XP-55202102A, Jan. 18, 2011, 10 pgs.

* cited by examiner

METHOD AND APPARATUS OF LINK ADAPTATION IN A WIRELESS LOCAL AREA NETWORK SYSTEM

CROSS REFERENCE TO RELATED APPLICATIONS

This application is the National Phase of PCT/KR2011/010015 filed on Dec. 22, 2011, which claims priority under 35 U.S.C. 119(e) to U.S. Provisional Application No. 61/425,763 filed on Dec. 22, 2010, and to U.S. Provisional Application No. 61/427,205 filed on Dec. 27, 2010, all of which are hereby expressly incorporated by reference into the present application.

TECHNICAL FIELD

The present invention relates to wireless communication and, more particularly, to a link adaptation method and apparatus in a Wireless Local Area Network (WLAN) system.

BACKGROUND ART

With the recent development of information communication technology, a variety of wireless communication techniques are being developed. From among them, a WLAN is technology for wirelessly accessing the Internet at homes or companies or in specific service providing areas by using portable terminals, such as a Personal Digital Assistant (PDA), a laptop computer, and a Portable Multimedia Player (PMP), based on radio frequency technology.

In order to overcome limitations to the communication speed that was considered as being weakness in a WLAN, an IEEE 802.11n standard has recently been established as a technology standard. An object of the IEEE 802.11n standard is to increase the speed and reliability of a network and to extend the coverage of a wireless network. More particularly, in order to support a High Throughput (HT) having a maximum data processing speed of 540 Mbps or higher, minimize an error in transmission, and optimize the data rate, the IEEE 802.11n standard is based on Multiple Inputs and Multiple Outputs (MIMO) technology using multiple antennas on both sides of a transmitter and a receiver.

As the WLAN is actively propagated and applications employing the WLAN are diversified, a necessity for a new WLAN system for supporting a throughput higher than the data processing speed supported by the IEEE 802.11n standard is on the rise. The next-generation WLAN system supporting a Very High Throughput (VHT) is a next version of the IEEE 802.11n WLAN system and is one of IEEE 802.11 WLAN systems which have recently been newly proposed in order to support a data processing speed of 1 Gbps or higher in a MAC Service Access Point (SAP).

The next-generation WLAN system supports transmission using a Multiple User-Multiple Input Multiple Output (MU-MIMO) scheme in which a plurality of non-Access Point Stations (AP STAs) accesses a radio channel at the same time in order to efficiently use the radio channel. According to the MU-MIMO transmission scheme, an AP can transmit a frame to one or more MIMO-paired STAs at the same time.

When an AP transmits data to a plurality of destination STAs on a plurality of spatial streams according to the MU-MIMO scheme, the plurality of destination STAs may have different capabilities. In other words, a supportable bandwidth, a Modulation Coding Scheme (MCS), Forward Error Correction (FEC), etc. may differ depending on a type, an object, a channel environment, etc. of an STA.

According to the MU-MIMO transmission scheme, an MU-MIMO transmitter (AP) can transmit data to each of a plurality of MU-MIMO-paired receivers through at least one spatial stream. Here, a channel between the transmitter and a first receiver and a channel between the transmitter and a second receiver may have mutual interference. Interference between the channels between the transmitter and the receiver may hinder normal data transmission and reception as described above, which may deteriorate the overall throughput of a WLAN system. In order to improve the throughput in a WLAN system supporting the MU-MIMO transmission scheme, a sequentially optimized and recommended Modulation and Coding Scheme (MCS) needs to be fed back by taking interference between different channels into consideration when data is transmitted. A method of an AP transmitting control information to an STA that has been requested to transmit a Modulation and Coding Scheme (MCS) feedback (MFB) so that the STA can calculate an optimized MCS value when calculating and feeding back a recommended MCS value and a method of efficiently transmitting supplementary information according to a type of an MFB when an STA transmits the MFB to an AP need to be taken into consideration.

SUMMARY OF INVENTION

Technical Problem

It is an object of the present invention to provide a method of an MFB requester transmitting control information necessary for a link adaptation procedure to an MCS feedback (MFB) responder in a WLAN system.

It is another object of the present invention to provide a method of an STA (i.e., an MFB responder), transmitting an MFB, efficiently transmitting the MFB and supplementary information according to a type of the MFB to an MFB requester in a WLAN system.

It is yet another object of the present invention to provide a link adaptation procedure of transmitting an optimized MFB on the basis of link adaptation control information, which may be applied to a WLAN system supporting MU-MIMO transmission.

Solution to Problem

In an aspect of the present invention, a method of transmitting a modulation and coding scheme (MCS) feedback (MFB), performed by a first station, in a wireless local area network system includes receiving, from a second station, a physical layer convergence procedure (PLCP) protocol data unit (PPDU), estimating a MFB based on the PPDU and transmitting, to the second station, feedback information including a MFB field and a MFB type field, the MFB field including the MFB, the MFB type field indicating whether or not the MFB is in response to a MFB request (MRQ) of the second station.

If the MFB type field indicates that the MFB is not in response to the MRQ of the second station, the feedback information may further include coding information of the PPDU from which the MCS feedback is estimated.

If the MFB type field indicates that the MFB is in response to the MRQ of the second station, the feedback information may not include the coding information of the PPDU.

The coding information may indicate whether a coding type applied to the PPDU is a binary convolutional code (BCC) or a low-density parity check (LDPC).

The PPDU may be a multi user (MU)-PPDU that carries at least one independent PLCP service data unit (PSDU) for at least one receiving station, and the PPDU may include a group ID indicating the at least one receiving station.

The feedback information may further include a first field and a second field, and if the MFB type field indicates that the MFB is not in response to the MRQ of the second station, the first field may include lowest 3 bits of the group ID and the second field may include highest 3 bits of the group ID.

If the MFB type field indicates that the MFB is in response to the MRQ of the second station, the first field may include a received value of MRQ sequence identifier (MSI) contained in the PPDU and the second field is reserved.

If the MFB type field indicates that the MFB is not in response to the MRQ of the second station, the feedback information may further include transmission type information indicating whether the PPDU is beamformed or unbeamformed.

The MFB may include information about a recommended number of space-time streams, a recommended MCS, bandwidth of the recommended MCS and average signal-to-noise ratio.

In another aspect of the present invention, a station of transmitting a MFB in a wireless local area network system including a processor configured to receive, from an Access Point (AP), a PPDU, estimate a MFB based on the PPDU and transmit, to the AP, feedback information including a MFB field and a MFB type field. The MFB field may include the MFB and the MFB type field may indicate whether or not the MFB is in response to a MRQ of the AP.

If the MFB type field indicates that the MFB is not in response to the MRQ of the AP, the feedback information may further include coding information of the PPDU from which the MCS feedback is estimated.

If the MFB type field indicates that the MFB is in response to the MRQ of the AP, the feedback information may not include the coding information of the PPDU.

The PPDU may be a multi user (MU)-PPDU that carries at least one independent PLCP service data unit (PSDU) for at least one receiving station and the PPDU may include group ID indicating the at least one receiving station.

The feedback information may further include a first field and a second field and if the MFB type field indicates that the MFB is not in response to the MRQ of the AP, the first field may include lowest 3 bits of the group ID and the second field may include highest 3 bits of the group ID.

If the MFB type field indicates that the MFB is in response to the MRQ of the AP, the first field may include a received value of MRQ sequence identifier (MSI) contained in the PPDU and the second field may be reserved.

Advantageous Effects of Invention

According to the present invention, in a link adaptation procedure, control information to which an MFB responder may make reference in calculating a recommended MCS value can be more effectively transmitted. Furthermore, according to an embodiment of the present invention, a link adaptation procedure can be performed in accompaniment with the transmission of a data frame and a management frame because link adaptation control information and an MFB are transmitted through an HT control field included in a MAC header. Furthermore, optimized link adaptation control information according to a type of a frame and an MFB can be transmitted by modifying an HT control field according to a type of a transmitted data frame or a transmitted management frame, and backward compatibility with a conventional system can be maintained.

MODE FOR THE INVENTION

A link adaptation method in a WLAN system and an apparatus for supporting the same according to embodiments of the present invention are described in detail below with reference to the accompanying drawings.

Figure 1:
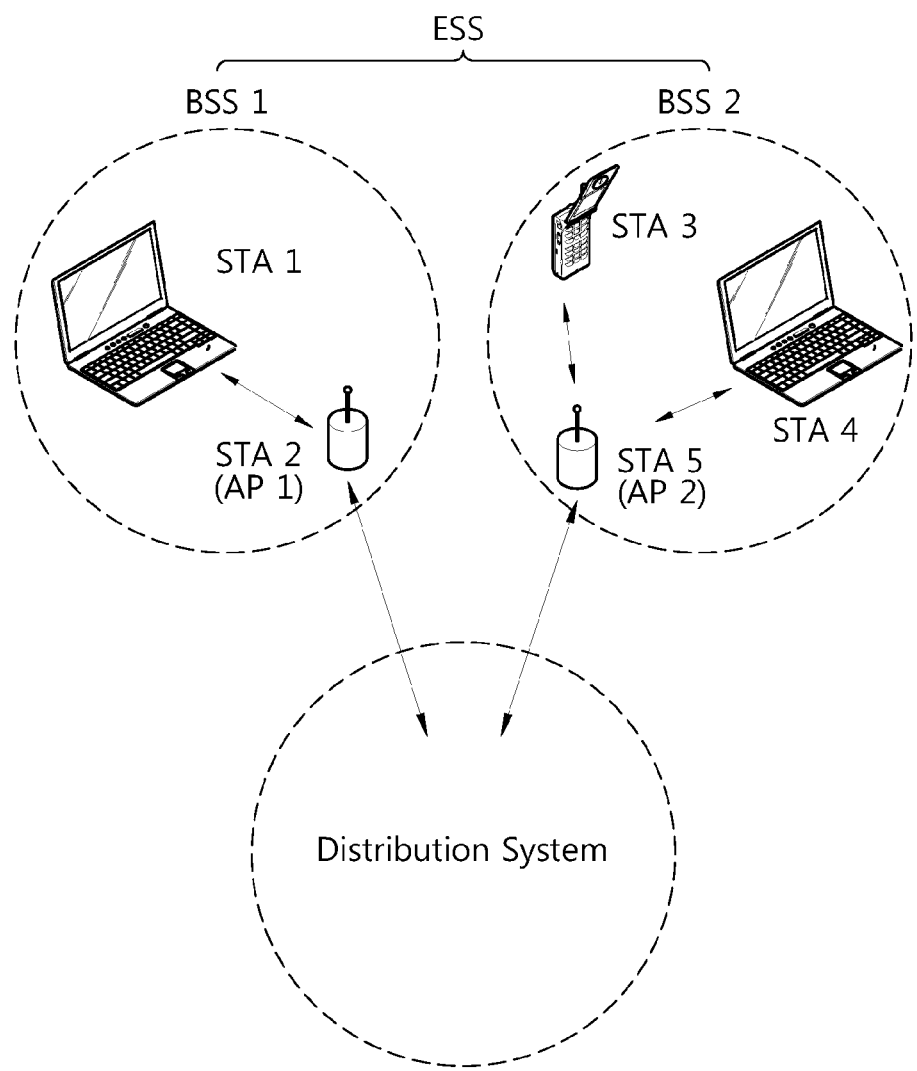
FIGS. 1 and 2 are simple diagrams showing the constructions of WLAN systems to which an embodiment of the present invention may be applied.
Figure 2:
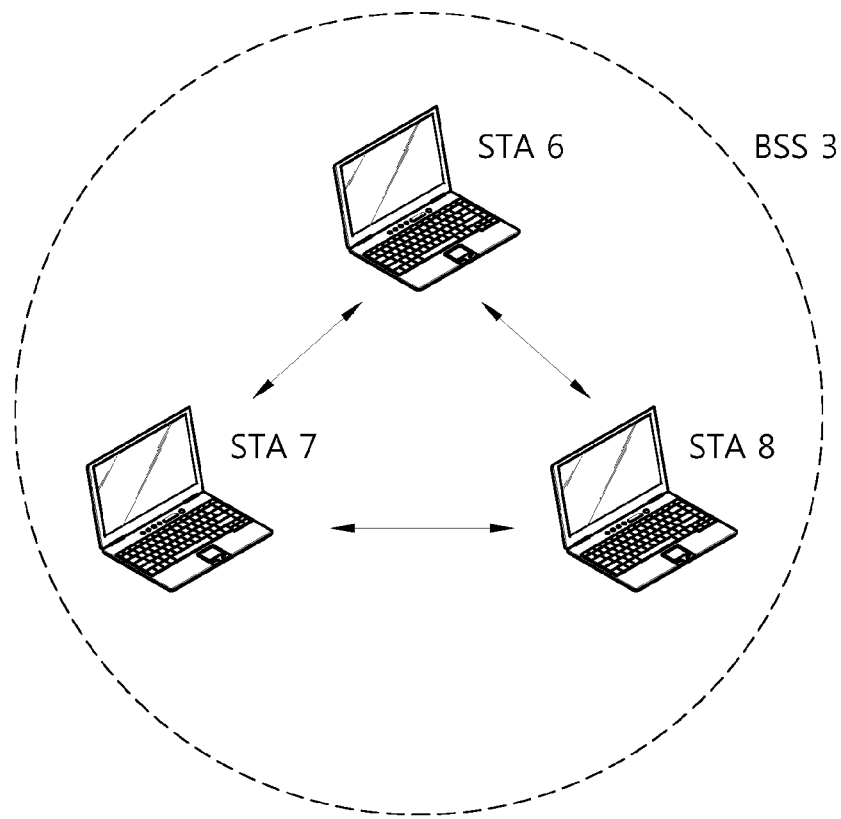

FIGS. 1 and 2 are simple diagrams showing the constructions of WLAN systems to which an embodiment of the present invention may be applied.

Referring to FIGS. 1 and 2, the WLAN system includes one or more Basic Service Sets (BSSs). The BSS is a set of STAs which are successfully synchronized with one another for communication, but the BSS is not a concept indicating a specific area. The BSS may be divided into an infrastructure BSS and an independent BSS (IBSS). The former is shown in FIG. 1, and the latter is shown in FIG. 2. The infrastructure BSSs BSS1 and BSS2 include one or more non-AP STAs STA1, STA3, and STA4, APs AP1 and AP2 (i.e., STAs providing distribution services), and a Distribution System (DS) coupling the plurality of APs AP1 and AP2. Meanwhile, in the IBSS, all STAs include mobile STAs STA6, STA7, and STA8 because an AP is not included in the IBSS. Furthermore, the IBSS forms a self-contained network because access to a DS is not permitted.

An STA is a specific function entity, including Medium Access Control (MAC) according to the IEEE 802.11 standard and a physical layer interface for a radio medium. In a broad sense, the STA includes both an AP and a non-AP STA. An STA for wireless communication includes a processor and a transceiver and may further include a user interface, display means, etc. The processor is a functional unit configured to generate frames to be transmitted over a wireless network or to process frames received over the wireless network. The processor can perform several functions for controlling an STA. Furthermore, the transceiver is a unit functionally coupled to the processor and configured to transmit and receive frames over a wireless network for an STA.

A mobile terminal manipulated by a user, from among STAs, includes non-AP STAs STA1, STA3, STA4, STA6, STA7, and STA8. When the mobile terminal is simply an STA, it is also called a non-AP STA. The non-AP STA may also be called another terminology, such as a Wireless Transmit/Receive Unit (WTRU), User Equipment (UE), a Mobile Station (MS), a Mobile Terminal (MT), or a Mobile Subscriber Unit (MSU).

Furthermore, the AP AP1 or AP2 is a functional entity for providing access to the DS via a radio medium for STAs associated therewith. In the infrastructure BSS including an AP, communication between non-AP STAs is basically performed via the AP. If a direct link has been set up, however, the non-AP STAs may directly communicate with one another. The AP may also be called another terminology, such as a centralized controller, a Base Station (BS), a node-B, a Base Transceiver System (BTS), or a site controller.

A plurality of infrastructure BSSs may be interconnected through a Distribution System (DS). A plurality of BSSs coupled through the DS is called an Extended Service Set (ESS). STAs included in the ESS may communicate with one another. A non-AP STA may move from one BSS to the other BSS while performing seamless communication within the same ESS.

The DS is a mechanism for enabling one AP to communicate with the other AP. According to this mechanism, an AP can transmit a frame to STAs associated with a BSS managed by the AP, transfer a frame if one STA has moved to another BSS, or transfer a frame to an external network, such as a wired network. The DS needs not to be necessarily a network, and it is not limited to any form if the DS can provide specific distribution service defined in the IEEE 802.11 standard. For example, the DS may be a wireless network, such as a mesh network, or may be a physical structure for coupling APs.

Figure 3:
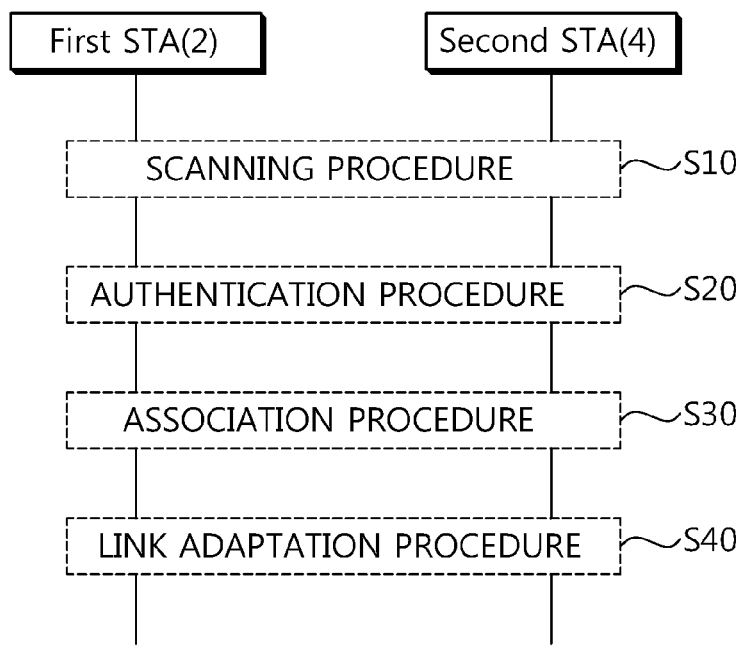
FIG. 3 is an operational procedure diagram showing the authentication and association related procedures of an STA in a WLAN system.

FIG. 3 is an operational procedure diagram showing the authentication and association related procedures of an STA in a WLAN system, such as that shown in FIG. 1 or 2, or a wireless communication system including the WLAN system. The operational procedure between a first STA 2 and a second STA 4 shown in FIG. 3 may be a procedure between a non-AP STA and an AP which form an infrastructure BSS, but it is evident that the present embodiment is not limited thereto. For example, the present embodiment may be applied to an operation between non-AP STAs forming an IBSS, an operation between Mesh Points (MPs) forming a mesh network system, or an operation between UEs forming different wireless communication systems or between UE and a BS in the same manner or in an equivalent manner other than operations to which the present embodiment cannot be essentially applied.

Referring to FIG. 3, a radio measurement procedure in the wireless communication system according to an embodiment of the present invention includes a scanning procedure S10, an authentication procedure S20, or an association procedure S30 or all of them which are preliminary processes. The radio measurement procedure may further include a link adaptation procedure S40 performed after the preliminary processes S10 to S30. According to an embodiment of the present invention, at least some of the preliminary processes may not be essential procedures, but may be arbitrary procedures.

Referring to FIG. 3, the scanning procedure S10 is first performed between the first STA 2 and the second STA 4. The scanning procedure S10 is a process of the first STA 2 searching for a candidate STA which is the subject to be associated therewith in the association procedure S30. For example, the scanning procedure S10 may be a process of a non-AP STA searching for an AP in an infrastructure BSS. In a broader sense, the scanning procedure S10 may include a process of a non-AP STA searching for an adjacent non-AP STA in case of an IBSS or a process of a non-AP STA searching for an adjacent MP in case of a mesh network.

The scanning procedure includes two methods. The first method is a passive scan method using a beacon frame transmitted by the second STA 4, etc. According to the passive scan method, the first STA 2 attempting to access a WLAN may search for an accessible BSS by receiving a beacon frame periodically transmitted by the second STA 4 (i.e., an AP managing a relevant BSS (or IBSS)). The passive scan method may be applied to a case where the second STA 4 is an AP that transmits a beacon frame.

The second method is an active scan method. According to the active scan method, the first STA 2 attempting to access a WLAN system first transmits a probe request frame. Next, the second STA 4 (e.g., an AP) that has received the probe request frame transmits a probe response frame including pieces of information, such as a Service Set ID (SSID) of a BSS managed by the second STA 4 and a supported capability, to the first STA 2. Accordingly, the first STA 2 may know various pieces of information about a candidate AP along with the existence of the candidate AP through the received probe response frame.

In the scanning process S10, the beacon frame or the probe response frame may include capability information about the second STA 4 that transmits the beacon frame or the probe response frame. The capability information may be information indicating whether the second STA 4 supports specific functions/service (e.g., MU-MIMO transmission, a link adaptation procedure to be described later according to the present invention, etc.). Furthermore, in the active scan method, the probe request frame transmitted by the first STA 2 may include capability information about the first STA 2. Each of the first STA 2 and the second STA 4 may inform its own capability in such a way to include a VHT capabilities element, including its own capability (i.e., information about whether a specific service is supported), in a frame and to transmit the frame.

Referring back to FIG. 3, the authentication procedure S20 is performed between the first STA 2 and the second STA 4. The authentication procedure S20 is a process in which an authentication procedure, an encryption method, etc. are negotiated between entities participating in wireless communication. For example, the first STA 2 may perform the authentication procedure S20 with the second STA 4 (e.g., an AP) to be associated therewith, from among one or more APs retrieved in the scanning procedure S10. If an open system authentication method is used, the second STA 4 performs an authentication process without any condition for an authentication request made by the first STA 2. More enhanced authentication methods may include IEEE 802.1x-based Extensible Authentication Protocol-Transport Layer Security (EAP-TLS), Extensible Authentication Protocol-Tunneled Transport Layer Security (EAP-TTLS), Extensible Authentication Protocol-Flexible Authentication via Secure Tunneling (EAP-FAST), a Protected Extensible Authentication Protocol (PEAP), etc.

When the authentication is successfully completed in the authentication procedure S20, the first STA 2 performs the association procedure S30. The association procedure at this stage may be an arbitrary procedure which is performed when the first STA 2 is a non-AP STA and the second STA 4 is an AP. The association procedure S30 means the identifiable connection between the first STA 2 and the second STA 4 (i.e., setting up a radio link). For the association procedure S30, the first STA 2 transmits an association request frame to the second STA 4 that has successfully completed the authentication procedure S20. In response to the association request frame, the second STA 4 transmits an association response frame, having a state value 'Successful', to the first STA 2.

The association response frame includes an identifier (e.g., an Association ID (AID)) to identify an association with the first STA 2.

If the connection between the first STA 2 and the second STA 4 (i.e., an AP) becomes poor owing to a variable channel condition after the association procedure S30 is successfully completed, the first STA 2 may perform an association procedure with another accessible AP. This is called a reassociation procedure. The reassociation procedure is very similar to the above association procedure S30. More particularly, in the reassociation procedure, the first STA 2 transmits a reassociation request frame to another AP (i.e., an AP that has successfully completed the authentication procedure S20, from among candidate APs retrieved in the scanning procedure S10) not the AP currently associated therewith. In response to the reassociation request frame, another AP transmits a reassociation response frame to the first STA 2. Here, the reassociation request frame further includes information about the existing AP previously associated with the first STA 2. The reassociation AP can transfer data, buffered in the second STA 4 (i.e., the existing AP), to the first STA 2 based on the information. The frame ((re)association request/response frame) transmitted in the association procedure or the reassociation procedure may include a VHT capabilities element including capability information about an STA that transmits the relevant frame.

After the authentication procedure and the association procedure are performed between the first STA 2 and the second STA 4 as shown in FIG. 3, radio frames can be transmitted and received between the first STA 2 and the second STA 4. An STA attempting to transmit a radio frame can obtain a transmission opportunity using a channel access method defined in the IEEE 802.11 standard and transmit the radio frame to a destination STA.

In order to achieve a higher throughput in a WLAN system, an STA equipped with multiple antennas may use an MIMO transmission scheme for transmitting or receiving independent data streams on the same channel at the same time. The MIMO transmission scheme is divided into an MU-MIMO transmission scheme for transmitting a data stream to a plurality of STAs and an SU-MIMO transmission scheme for transmitting a data stream to a single STA. Hereinafter, a method in which an AP transmits a Physical Layer Convergence Procedure (PLCP) Protocol Data Unit (PPDU) to a plurality of destination STAs according to the MU-MIMO transmission scheme is called a downlink (DL) MU-MIMO method, and a PPDU for carrying an in-dependent PLCP Service Data Unit (PSDU) for one or more STAs using the MU-MIMO transmission scheme is called an MU PPDU.

For MIMO transmission, the link adaptation procedure S40 of referring to the determination of an MCS value to be applied to each data stream may be performed. The link adaptation procedure is a process of, when the first STA 2 requests the second STA 4 to calculate a recommended MCS value and to transmit the recommended MCS value thereto, the second STA 4 calculating the recommended MCS value based on control information received from the first STA 2 and feeding the recommended MCS value back to the first STA 2. The first STA 2 may determine an MCS that will be applied to a data stream to be subsequently transmitted with reference to the recommended MCS value obtained in the link adaptation procedure. The link adaptation procedure may be performed prior to the transmission of a data stream or in accompaniment with the data stream.

Hereinafter, the first STA 2 that request the transmission of an MCS feedback (MFB) to initiate the link adaptation procedure is called an MFB requester, and the second STA 4 that calculates a recommended MCS value and transmits the MFB is called an MFB responder. In an infrastructure BSS, an MCS requester may be an AP, and an MCS responder may be a non-AP STA. In the link adaptation procedure, a method of an MFB requester transmitting control information and a method of an MFB responder feeding back a recommended MCS value calculated based on the control information are described in detail in connection with embodiments.

Figure 4:
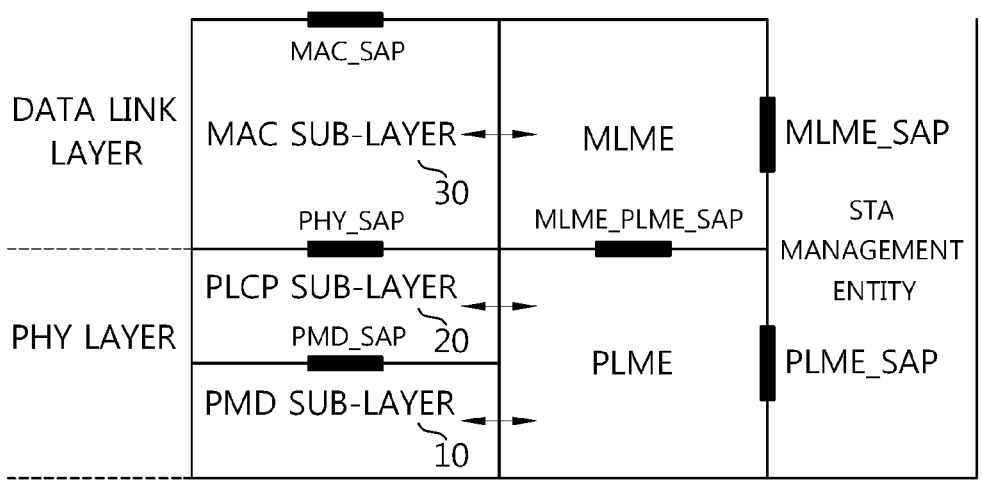
FIG. 4 is a diagram showing the physical layer (PHY) architecture of a WLAN system

FIG. 4 is a diagram showing the physical layer (PHY) architecture of a WLAN system.

The PHY architecture of the IEEE 802.11 standard includes a PHY Layer Management Entity (PLME), a Physical Layer Convergence Procedure (PLCP) sub-layer 20, and a Physical Medium Dependent (PMD) sub-layer 10. The PLME provides the management function of the physical layer while operating in conjunction with a MAC Layer Management Entity (MLME). The PLCP sub-layer 20 transfers a MAC Protocol Data Unit (MPDU), received from a MAC sub-layer 30, to a sub-layer or transfers a frame from the PMD sub-layer 10 to the MAC sub-layer 30 according to the instruction from a MAC layer between the MAC sub-layer 30 and the PMD sub-layer 10. The PMD sub-layer 10 is a PLCP lower layer, and it enables the transmission and reception of PHY entities between two STAs through a radio medium. The MPDU transferred by the MAC sub-layer 30 is called a Physical Service Data Unit (PSDU) in the PLCP sub-layer 20.

The PLCP sub-layer 20 attaches a supplementary field, including information necessary for a PHY transceiver, in a process of receiving the PSDU from the MAC sub-layer 30 and transferring the PSDU to the PMD sub-layer 10. Here, the supplementary field may be a PLCP preamble, a PLCP header, or tail bits necessary to return a convolution encoder to a zero state in the PSDU. The PLCP sub-layer 20 receives a TXVECTOR parameter, including control information necessary to generate and transmit a PLCP Protocol Data Unit (PPDU) and control information necessary for a reception STA to interpret the PPDU, from the MAC sub-layer 30. The PLCP sub-layer 20 may generate the PPDU including the PSDU by using the information included in the TXVECTOR parameter.

The PLCP preamble functions to make a receiver prepared for a synchronization function and an antenna diversity before the PSDU is transmitted. A data field may include padding bits, a service field including a bit sequence for resetting a scrambler, and a coded sequence encoded from the bit sequence to which tail bits have been added in the PSDU. Here, an encoding scheme may include one of Binary Convolutional Coding (BCC) encoding and Low Density Parity Check (LDPC) encoding according to an encoding scheme supported by an STA that receives the PPDU. The PLCP header may include a field including information about the PLCP to be transmitted.

The PLCP sub-layer 20 generates the PPDU by adding the field to the PSDU and transmits the PPDU to a reception STA through the PMD sub-layer 10. The reception STA receives the PPDU, obtains information from the PLCP preamble and the PLCP header, and restores data based on the information. The PLCP sub-layer 20 of the reception STA transfers an RXVECTOR parameter, including control information included in the PLCP preamble and the PLCP header, to the MAC sub-layer 30. The MAC sub-layer 30 of the reception STA can interpret the PPDU and obtain data by using the RXVECTOR parameter.

Figure 5:
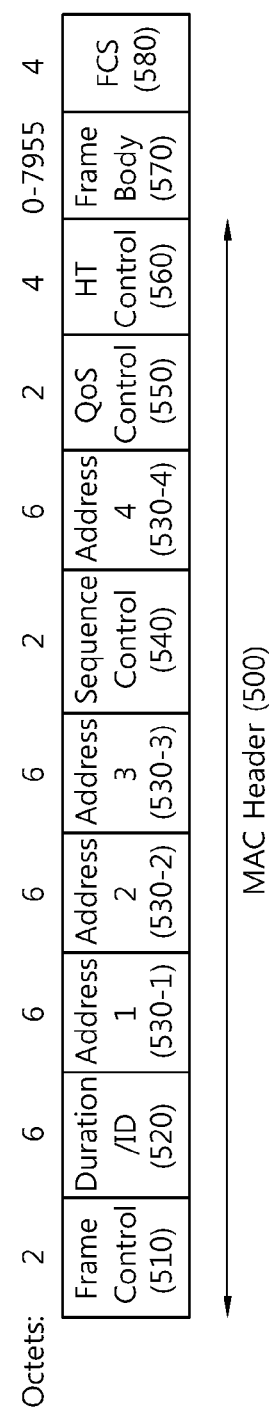
FIG. 5 is an example of a MAC frame format which may be used in the MAC layer of a WLAN system.

FIG. 5 is an example of a MAC frame format which may be used in the MAC layer of a WLAN system.

The MAC frame format includes a MAC header 500, a frame body 570, and a Frame Check Sequence (FCS) 580.

The MAC header 500 further includes a frame control field 510, a duration/ID field 520, four address fields 530-1 to 530-4, a sequence control field 540, a Quality of Service (QoS) control field 550, and a HT Control field 560.

The frame control field 510 may include information about a version of a protocol, information indicating a type and subtype of a frame, information for interpreting the four address fields, information indicating whether additional fragments to be transmitted after a packet of a higher level is fragmented by MAC exist, information indicating whether a frame has been resent, information indicating whether an STA has entered a power saving mode, information indicating whether a buffered frame to be transmitted to an STA exists, information for data protection and authentication, and an order bit.

A sequence bit included in the frame control field 510 has a length of 1 bit. If the HT Control field 560 is included in the MAC frame, an STA which receives the sequence bit by setting the sequence bit to 1 may be informed that the HT Control field 560 is included in the MAC frame.

The duration/ID field 520 may have a length of 2 octets. The duration/ID field 520 is used for the NAV setting of an STA. The duration/ID field 520 may indicate whether a relevant frame is a frame transmitted during a contention-free period or a PS-poll frame according to the setting of a bit 14 or bit 15 value.

Each of the four address fields 530-1, 530-2, 530-3, and 530-4 may have a length of 48 bits, and it may be set as an individual address, a group address, or a broadcast address according to the setting of a bit value. Each of the four address fields may indicate any one of a Destination Address (DA), a Source Address (SA), a Receiver Address (RA), a Transmitter Address (TA), and a BSS ID.

The sequence control field 540 may be used to defragment fragmented frames and to discard a duplicate frame.

The frame body 570 is also called a data field and is used to move higher-layer data from a transmission STA to a reception STA.

The FCS 580 is also called a Cyclic Redundancy Check (CRC) and is used to enable an STA to check the integrity of a received frame. When a frame is transmitted to a radio interface, an FCS is calculated before a frame is transmitted to a Radio Frequency (RF) link. A reception STA may calculate an FCS from a received frame and check whether the frame is abnormal in a transmission process by comparing the calculated FCS with the received FCS.

Figure 6:
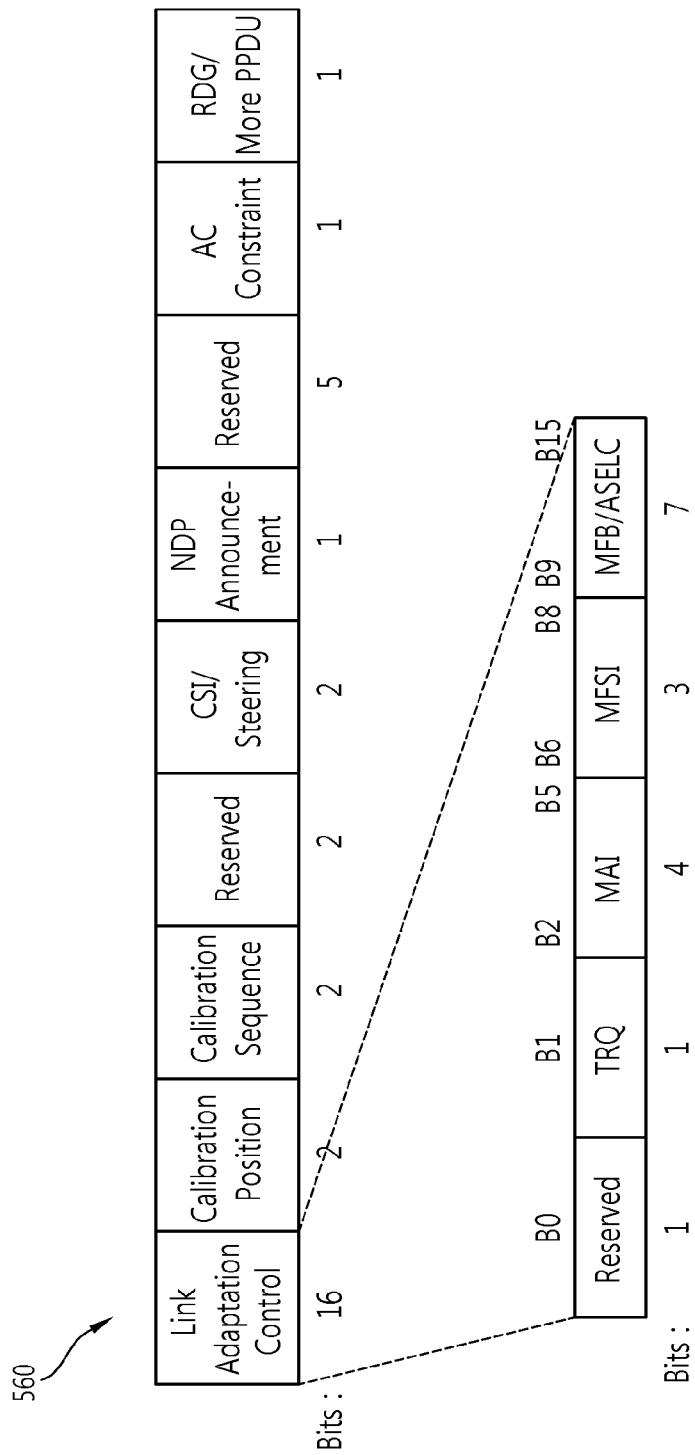
FIG. 6 is a block diagram showing the HT Control field of the IEEE 802.11n standard.

FIG. 6 is a block diagram showing the HT Control field of the IEEE 802.11n standard.

The HT Control field may be included in the MAC header of a MAC frame. The HT Control field includes a Link Adaptation Control field. The Link Adaptation Control field may include information necessary to estimate a channel between a transmission STA (i.e., an AP in DL MU-MIMO transmission) and a reception STA and to calculate a recommended MCS value.

The Link Adaptation Control field defined in the IEEE 802.11n standard may include a bit 600 reserved for use, TRQ 610 indicating whether to request a reception STA to transmit a sounding PPDU used for channel estimation, MAI 620 indicating a Modulation and Coding Scheme (MCS) or antenna selection, MFSI 630 indicating order of an MFB, and MFB/ASELC 640 indicating an MFB and antenna selection command/data.

The HT Control field may further include a Calibration Position field, a Calibration Sequence field, a CSI/Steering field, an NDP Announcement field, an AC Constraint field, and an RDG/More PPDU field.

For the function of the HT Control field and the functions of the fields forming the HT Control field, reference may be made to Paragraph 7.1.3.5a of IEEE Std. 802.11n™-2009 disclosed Oct. 29, 2009.

Control information transmitted through a conventional HT Control field is for MIMO transmission for a single STA (i.e., SU-MIMO transmission). For more efficient link adaptation in a WLAN system supporting MU-MIMO transmission, more information has to be transmitted to an MFB responder. A link adaptation method and a method of transmitting control information for the link adaptation method according to embodiments of the present invention are proposed hereinafter.

According to an embodiment of the present invention, control information for calculating an MFB (hereinafter referred to as 'link adaptation procedure control information') may be included in the header of a MAC frame and transmitted. The link adaptation procedure control information according to the embodiment of the present invention may be hereinafter defined as a new field and included in the MAC header of the existing MAC frame format or may be included in the HT Control field of the MAC header of the existing MAC frame format. Unlike an HT Control field in an HT WLAN system supporting the IEEE 802.11n standard, an HT Control field that may be used in a VHT WLAN system providing the link adaptation procedure control information according to the present invention and supporting the link adaptation procedure is hereinafter called a VHT Control field. The VHT Control field may also be called a VHT variant HT Control field in that unnecessary information is removed from the HT Control field and the link adaptation procedure control information is included.

The VHT Control field proposed by the present invention may be included in the MAC header of a MAC frame and transmitted, thereby providing the link adaptation procedure control information to a reception STA. Furthermore, in the VHT Control field, compatibility with a conventional MAC frame format can be maintained and control information can be efficiently transmitted using limited bits because control information can be included in 32 bits of the conventional HT Control field.

The VHT Control field proposed by the present invention may have a length of 32 bits. As described above, the VHT Control field may include information necessary for a more efficient link adaptation procedure instead of unnecessary information in a VHT WLAN system, from among pieces of information which are transmitted in the HT Control field and transmitted. The VHT Control field according to the embodiment of the present invention may include at least one of information indicating whether an MFB responder transmits an MFB at the request of an MFB requester, information indicating whether frame transmission is subject to beamforming, information indicating whether transmit diversity using an Alamouti transmission scheme has been applied, information indicating whether a data stream is transmitted according to the MU-MIMO transmission scheme or the SU-MIMO transmission scheme, information for power saving management per transmission opportunity (TXOP), information indicating a coding scheme applied to a data stream, and information indicating a point of time at which an MFB was transmitted (i.e., information indicating whether an MFB responder will immediately transmit an MFB or delay the transmission of the MFB for some time when the MFB responder is requested to transmit the MFB). All the pieces of link adaptation procedure control information may be included in the VHT Control field or only some of the pieces of link adaptation procedure control information may be included in the VHT Control field, if necessary. Whether specific information is included in the VHT Control field or whether another piece of information is included in the VHT Control field according to the setting value of a field indicating the specific information and a setting value thereof may be changed.

The pieces of link adaptation procedure control information may be transmitted instead of pieces of information which are included in the TRQ field (B1 bit), the Calibration Position field (B16, B17), the Calibration Sequence field (B18, B19), the CSI/Steering field (B22, B23), and the NDP Announcement field (B24) of the HT Control field shown in the example of FIG. 6.

The pieces of link adaptation procedure control information transmitted through the VHT Control field are described below with reference to examples in which the VHT Control fields are configured. In the examples of the configurations of the VHT Control fields, the names of fields and order of the configurations of the VHT Control fields are arbitrary, and the present invention is not limited to the names of the fields and order of the configurations of the VHT Control fields.

Figure 7:
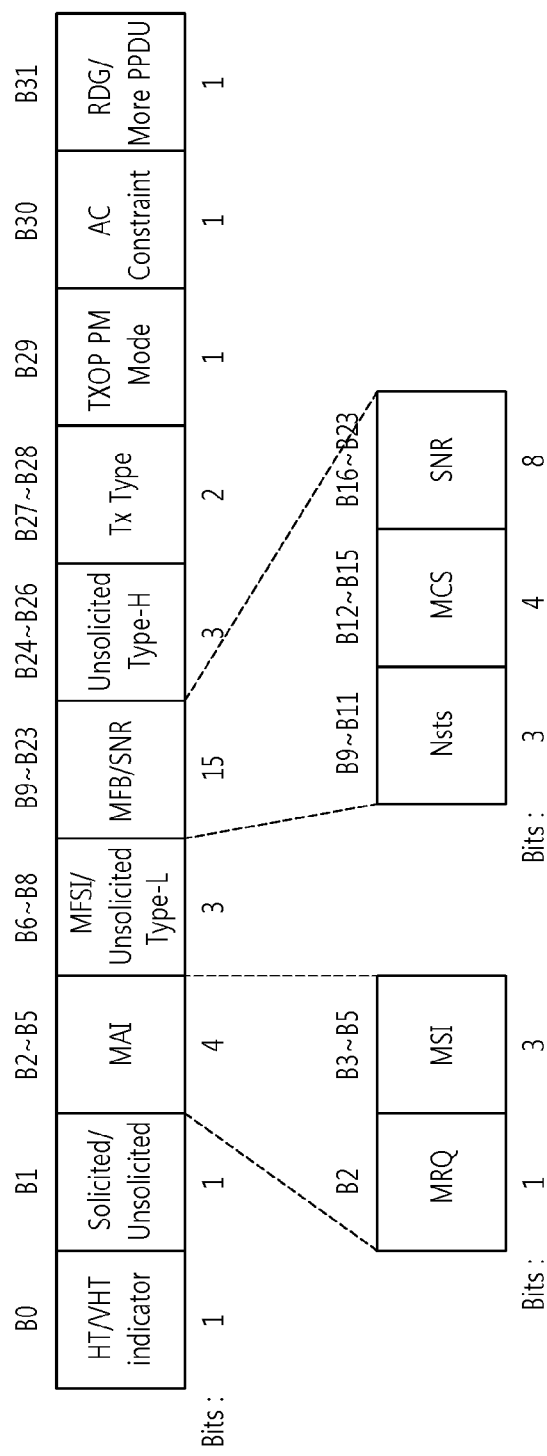
FIGS. 7 and 8 are block diagrams showing examples of the configurations of the VHT Control fields according to embodiments of the present invention.
Figure 8:
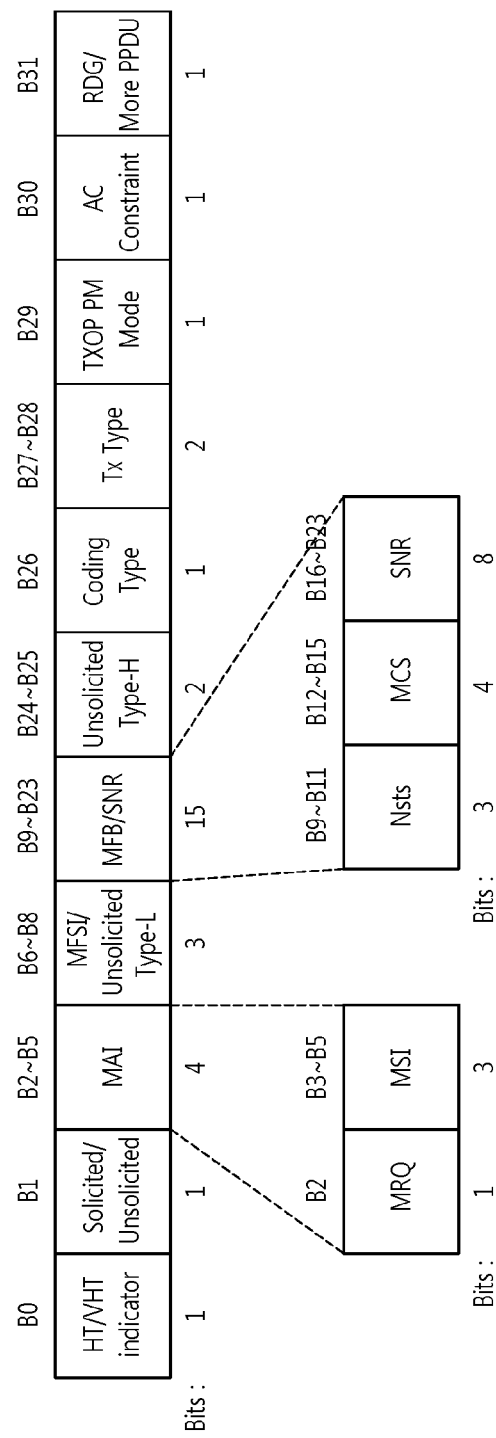

FIGS. 7 and 8 are block diagrams showing examples of the configurations of the VHT Control fields according to embodiments of the present invention.

FIGS. 7 and 8 show only examples of a lot of formats in which fields to be described below are combined and included. The configurations of the VHT Control fields proposed by the present invention are not limited to the examples of FIGS. 7 and 8. The VHT Control field proposed by the present invention may include all or some of the fields to be described later which are combined.

The VHT Control field may include an HT/VHT indicator field. The HT/VHT indicator field may have a length of 1 bit, and it indicates whether the HT Control field is a VHT variant HT Control field (i.e., a VHT Control field) or an HT variant HT Control field. When a QoS data frame or a management frame is received, a reception STA checks the order bit of the frame control filed of the MAC header of the relevant frame. If the order bit is set to 1, the reception STA may know that an HT Control field is included in the MAC header of the relevant frame. In this case, the reception STA may know a type of the HT Control field by checking the HT/VHT indicator bit of the HT Control field. For example, if the HT/VHT indicator bit is set to 0, the reception STA may know that the HT Control field is an HT variant HT Control field. If the HT/VHT indicator bit is set to 1, the reception STA may know that the HT Control field is a VHT variant HT Control field.

The VHT Control field proposed by the present invention may include a Solicited/Unsolicited field indicating whether an MFB included in the VHT Control field is transmitted according to the MCS request (MRQ) of an MFB requester or is transmitted irrespective of the MCS request (MRQ) of the MFB requester. The Solicit/Unsolicited field may have a length of 1 bit. The Solicited/Unsolicited field may be set to 1 if an MFB is not a response to the MRQ and may be set to 0 if an MFB is a response to the MRQ. A reception STA may know whether the MFB of the HT Control field is a solicited MFB according to the request of an MFB requester or an un-solicited MFB without the request of an MFB requester on the basis of the setting of the Solicited/Unsolicited field. In addition, according to an embodiment of the present invention, a reception STA may differently interpret other fields of the VHT Control field according to the setting value of the Solicited/Unsolicited field. This is described from a viewpoint of a transmission STA. A transmission STA may make different information, transmitted using other fields, according to the setting value of the Solicited/Unsolicited field of a VHT Control field. A field that may be differently interpreted according to the setting value of the Solicited/Unsolicited field and a detailed example of the interpretation are described below along with the function of the relevant fields.

The VHT Control field may include an MRQ field. The MRQ field may have a length of 1 bit, and it may indicate whether an MFB has been requested. When an MFB requester transmits a data frame or a management frame, the MFB requester may indicate whether it requests an MFB from a reception STA that receives the data frame or management frame by setting the MRQ field of the VHT Control field which is included in the MAC header of the data frame or management frame. For example, if an MFB is to be requested, the MRQ field may be set to 1 and transmitted. If an MFB is not to be requested, the MRQ field may be set to 0 and transmitted. An STA that receives a relevant frame may know whether the STA has been requested to transmit the MFB by checking the setting value of the MRQ field.

The VHT Control field may include an MRQ Sequence Identifier (MSI) field. The MSI field may have a length of 3 bits. If an MFB requester requests an MFB (i.e., if the MFB requester sets the Solicited/Unsolicited field to 0 and the MRQ field to 1 and transmits a data frame or management frame), the sequence number of the MRQ may be included.

The VHT Control field may include an MFSI/Unsolicited Type-L field and an Unsolicited Type-H field. Each of the MFSI/Unsolicited Type-L field and the Unsolicited Type-H field may have a length of 3 bits. A reception STA may interpret the MFSI/Unsolicited Type-L field and the Unsolicited Type-H field as different pieces of information according to the setting value of the Solicited/Unsolicited field. If the Solicited/Unsolicited field is set to 1 (i.e., when an MFB is not transmitted in response to an MRQ), the MFSI/Unsolicited Type-L field and the Unsolicited Type-H field may include Group ID (GID) information. If an MFB is an unsolicited MFB not transmitted in response to an MRQ and has been calculated on the basis of an MU PPDU, a GID is the GID of an MU PPDU. That is, the GID is the GID of 6 bits which indicate a target transmission STA for the MU PPDU that is a basis for calculating an MFB. The highest 3 bits of the GID may be transmitted through the Unsolicited Type-H field, and the lowest 3 bits of the GID may be transmitted through the MFSI/Unsolicited Type-L field. If an unsolicited MFB is estimated from an SU PPDU, the MFSI/Unsolicited Type-L field and the Unsolicited Type-H field may be set to 1.

If the Solicited/Unsolicited field is set to 0, the MFSI/Unsolicited Type-L field contains the received value of an MSI contained in a frame to which MFB information refers and the Unsolicited Type-H field may be reserved.

Table 1 is a list of pieces of information which are included in the Solicited/Unsolicited field, the MFSI/Unsolicited Type-L field, and the Unsolicited Type-H field according to their setting values.

TABLE 1

|  | Solicited/Unsolicited field == 0 | Solicited/Unsolicited field == 1 |
| --- | --- | --- |
| MFSI/Unsolicited Type-L field | MFSI (MFB sequence identifier) | Lowest 3 bits of GID |
| Unsolicited Type-H field | Reserved | Highest 3 bits of GID |

The VHT Control field may include an MFB/SNR field. The MFB/SNR field includes a recommended NSTS, a recommended MCS, and an average SNR value calculated by an MFB responder. If the Solicited/Unsolicited field is set to 1, the MFB/SNR field may further include the bandwidth of recommended MCS information.

Table 2 is a list of subfields and pieces of information which are included in the MFB/SNR field.

TABLE 2

| Subfield | Meaning | Definition |
| --- | --- | --- |
| N_STS | Recommended $N_{STS}$ | Indicates a recommended $N_{STS}$ |
| MCS | Recommended MCS | Indicates a recommended VHT MCS |
| BW | Bandwidth of recommended MCS | Indicates a bandwidth for which a recommended MCS is intended. |
| SNR | Average SNR | Indicates an average SNR, which is an SNR averaged over data subcarriers and space-time streams |

The VHT Control field may include a TX Type field. The Tx Type field includes information indicating a transmission type of a frame that has been referred to calculate an unsolicited MFB when the unsolicited MFB is transmitted. The Tx Type field may have a length of 1 bit or 2 bits according to its implementation. The Tx Type field may indicate whether a frame referred to calculate an MFB has been beamformed and transmitted, whether the frame has been unbeamformed and transmitted, and whether the frame has been subject to Alamouti. If the Tx Type field has a length of 1 bit, the Tx Type field may indicate whether a frame referred to calculate an MFB has been beamformed and transmitted. If the Solicited/Unsolicited field is set to 1 and the Tx Type field is set to 0, an unsolicited MFB is estimated from an unbeamformed VHT PPDU. If the Solicited/Unsolicited field is set to 1 and the Tx Type field is set to 1, an unsolicited MFB is estimated from a beamformed VHT SU PPDU.

The VHT Control field may include a Coding Type field.

The Coding Type field indicates the coding scheme of a frame that has been referred to calculate an unsolicited MFB when the unsolicited MFB is transmitted. When an unsolicited MFB is received, an MFB requester may know the coding scheme of a frame that has been referred to calculate the unsolicited MFB on the basis of the setting value of the Coding Type field. If the Solicited/Unsolicited field is set to 1, the Coding Type field contains Coding information (0 for BCC and 1 for LDPC) from which an unsolicited MFB was estimated. An MFB requester may determine a coding scheme and an MCS that will be applied to a data frame or a management frame to be transmitted with reference to the setting value of the Coding Type field.

The VHT Control field may further include a field, indicating a point of time at which an MFB responder transmitted an MFB when an MFB requester requests an MRQ from the MFB responder. In other words, the field may indicate whether the MFB responder is requested to immediately transmit the MFB. If the field indicates that the MFB responder is requested to immediately transmit the MFB, the MFB responder transmits the MFB through a response frame transmitted in response to a frame including the MRQ. Alternatively, the MFB may be transmitted through a frame that is transmitted to the MFB requester for the first time after the MRQ is received. For example, if an MRQ is included in a data frame and transmitted, an MFB may be transmitted on a block ACK message when the block ACK message for the data frame is transmitted. Alternatively, if an MRQ has been requested in a Null Data Packet Announcement (NDPA) frame within a sounding protocol in which a Null Data Packet (NDP) frame is transmitted, the MFB may be transmitted on a feedback frame transmitted by the NDP frame or a sounding poll frame.

The Immediate MRQ may do not need a specific sequence number because it immediately requires an MFB. According to an embodiment of the present invention, the immediate MRQ may be included in the sequence number of an MRQ and transmitted through an MSI field or an MLSI field or both. As an embodiment, the MSI field of 3 bits may be set to a value 0 to 7. From among the values, the values 0 to 6 may be used as an MRQ sequence number, and the value 7 may be used to indicate the immediate MRQ. Likewise, in a solicited MFB, MFSI values set to 0 to 6 may be used as a response MFB to an MRQ sequence, and an MFSI value set to 7 may be used as a response to the immediate MRQ.

The link adaptation procedure using the VHT Control field according to the present invention is described below.

An MFB responder may transmit a solicited MFB, an unsolicited MFB, and two types of MFBs. The MFB responder may transmit the unsolicited MFB or the solicited MFB depending on whether it transmits an MFB in response to an MRQ received from an MFB requester. According to an embodiment of the present invention, the unsolicited MFB or the solicit MFB may be included in the VHT Control field which is include in the MAC header of an MAC frame and then transmitted.

The MFB requester may set the MRQ field to 1 in the VHT Control field of a frame to request an STA to provide MCS, N_STS, and SNR feedback. In each request, the MFB requester shall set the MSI field to a value in the range 0 to 6.

The MFB requester may transmit the VHT Control field of an NDP Announcement (NDPA) frame by setting the MRQ field of the VHT Control field to 1 or may request the MFB by setting the MRQ field of the VHT Control field of a frame different from an NPDA frame. Here, the NDPA frame is a management frame informing that a Null Data Packet (NDP) frame is transmitted after the NDPA frame is transmitted. If the MRQ is received through the NDPA frame, the MFB responder may calculate a recommended MCS, a recommended N_STS, and an averaged SNR on the basis of the NDP frame transmitted after the NDPA frame is transmitted. If the MRQ is received through the frame different from the NDPA frame, the recommended MCS, the recommended N_STS, and the averaged SNR may be calculated on the basis of the relevant frame including the MRQ. When transmitting the MFB in response to the MRQ, the MCS responder sets the HT/VHT indicator bit of the VHT Control field to 1. The Solicited/Unsolicited field is set to 0, indicating that the MFB is a solicited MFB transmitted in response to the MRQ. Here, the MFSI/Unsolicited Type-L field is set to an MFSI value which is a duplicate value of the MSI value of a frame on which the MFB has been calculated.

An STA sending unsolicited MFB feedback using the VHT Control field may set the Solicited/Unsolicited field to 1.

Unsolicited MCS, N_STS, BW and SNR estimates reported in the MFB field of a VHT Control field sent by a STA are computed based on the most recent PPDU received by the STA that matches the description indicated by the MFSI/Unsolicited Type-L field, the Unsolicited Type-H field, the Coding Type field, and the FB TX Type fields in the VHT Control field.

In an unsolicited MFB response, the MFSI/Unsolicited Type-L field, the Unsolicited Type-H field, the Coding Type field, and the TX Type fields may be set according to the parameters RXVECTOR of a received PPDU from which the MCS, SNR, BW and N_STS are estimated, as follows:

If the MCS, SNR, BW and N_STS are estimated from an MU PPDU, the MFSI/Unsolicited Type-L field is set to the 3 least significant bits of a GID and the Unsolicited Type-H field is set to the 3 most significant bits of the GID.

If the MCS, SNR, BW and N_STS are estimated from an SU PPDU, the MFSI/Unsolicited Type-L field and the Unsolicited Type-H field are set to 1. (The value of the Unsolicited Type-L field and the Unsolicited Type-H field indicates whether an un-solicited feedback has been estimated from an SU PPDU or an MU PPDU).

The Coding Type field is set to 0 if the parameter FEC_CODING of the parameters RXVECTOR is equal to BCC_CODING and is set to 1 if the parameter FEC_CODING of the parameters RXVECTOR is equal to LDPC_CODING.

The TX Type field is set to 1 if the parameter BEAMFORMED of the parameters RXVECTOR is equal to 1 and is set to 0 if the parameter BEAMFORMED of the parameters RXVECTOR is equal to 0.

Figure 9:
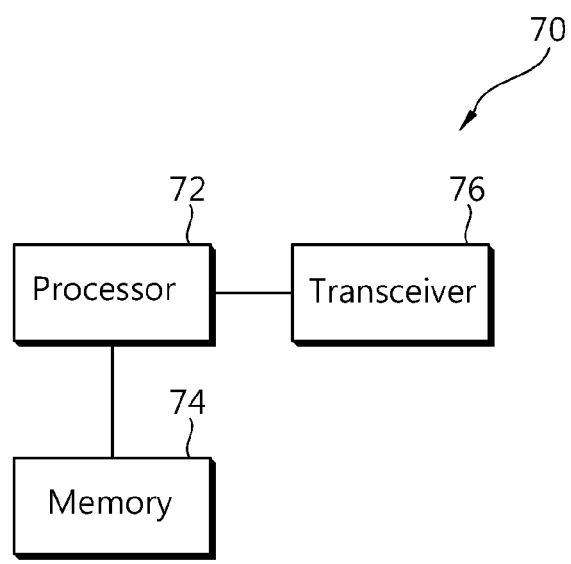
FIG. 9 is a block diagram showing a wireless apparatus to which the embodiments of the present invention may be applied.

FIG. 9 is a block diagram showing a wireless apparatus to which the embodiments of the present invention may be applied. The wireless apparatus 70 may be an MFB responder or an MFB requester participating in a link adaptation procedure or may be an STA that transmits an unsolicited MFB.

The wireless apparatus 70 includes a processor 72, memory 74, and a transceiver 76. The transceiver 76 transmits and receives radio signals, and it is implemented by the physical layer of the IEEE 802.11 standard. The processor 72 is functionally coupled to the transceiver 76 and configured to implement the MAC layer and the physical layer of the IEEE 802.11 standard. The processor 72 may be configured to generate and transmit a frame including the VHT Control field proposed by the present invention or to obtain pieces of control information by interpreting the values of the VHT Control field included in a received frame. If the wireless apparatus 70 is operated as an STA transmitting an MFB, the processor 72 may be configured to calculate a recommended MCS when the link adaptation procedure is started so that the link adaptation method according to the present invention can be supported and to feed back the calculated recommended MCS to an AP. The processor 72 may be configured to implement the embodiments of the present invention.

The processor 72 or the transceiver 76 or both may include Application-Specific Integrated Circuits (ASICs), other chipsets, logic circuits, data processors or all of them. The memory 74 may include Read-Only Memory (ROM), Random Access Memory (RAM), flash memory, memory cards, storage media and/or other storage devices. When the embodiment is implemented in software, the above scheme may be implemented using a module (process or function) which performs the above functions. The module may be stored in the memory 74 and executed by the processor 72. The memory 74 may be placed inside or outside the processor 72 and functionally coupled to the processor 72 by a variety of well-known means.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method of transmitting information on a modulation and coding scheme (MCS) in a wireless local area network system, the method comprising:

receiving, by a first station from a second station, a physical layer protocol data unit (PPDU);

configuring, by the first station, a MCS feedback (MFB) based on the PPDU; and transmitting, by the first station to the second station, feedback information including the configured MFB and a MFB type field, wherein the MFB type field indicates whether or not the MFB is configured as a response to a MFB request (MRQ) of the second station, and wherein the feedback information further includes coding information indicating a coding type of the PPDU if the MFB type field indicates that the MFB is not configured as a response to the MRQ of the second station.

2. The method of claim 1, wherein the coding information is 1-bit field, wherein the coding information is set to '1' when the coding type is a low density parity check (LDPC) type, and wherein the coding information is set to '0' when the coding type is a binary convolutional code (BCC) type.

3. The method of claim 2, wherein if the MFB type field indicates that the MFB is configured as a response to the MRQ of the second station, the feedback information does not include the coding information of the PPDU.

4. The method of claim 2, wherein the coding information indicates whether a coding type applied to the PPDU is a binary convolutional code (BCC) or a low-density parity check (LDPC).

5. The method of claim 1, wherein the PPDU is a multi user (MU)-PPDU that carries at least one independent PLCP service data unit (PSDU) for at least one receiving station, the PPDU including a group ID indicating the at least one receiving station.

6. The method of claim 5, wherein the feedback information further includes a first field and a second field, and if the MFB type field indicates that the MFB is not configured as a response to the MRQ of the second station, the first field includes lowest 3 bits of the group ID and the second field includes highest 3 bits of the group ID.

7. The method of claim 6, wherein if the MFB type field indicates that the MFB is configured as a response to the MRQ of the second station, the first field includes a received value of MRQ sequence identifier (MSI) contained in the PPDU and the second field is reserved.

8. The method of claim 1, wherein if the MFB type field indicates that the MFB is not configured as a response to the MRQ of the second station, the feedback information further includes transmission type information indicating whether the PPDU is beamformed or unbeamformed.

9. The method of claim 1, wherein the MFB includes information about a recommended number of space-time streams, a recommended MCS, bandwidth of the recommended MCS and average signal-to-noise ratio.

10. A station for transmitting information on a modulation and coding scheme (MCS) in a wireless local area network system, the station comprising:

a transceiver; and a processor operably coupled with the transceiver and configured to:

control the transceiver to receive, from an Access Point (AP), a physical layer protocol data unit (PPDU);

configure a MCS feedback (MFB) based on the PPDU; and transmit, to the AP, feedback information including the configured MFB and a MFB type field, wherein the MFB type field indicates whether or not the MFB is configured as a response to a MFB request (MRQ) of the AP, and wherein the feedback information further includes coding information indicating a coding type of the PPDU if the MFB type field indicates that the MFB is not configured as a response to the MRQ of the AP.

11. The station of claim 10,
wherein the coding information is 1-bit field,
wherein the coding information is set to '1' when the coding type is a low density party parity check (LDPC) type, and
wherein the coding information is set to '0' when the coding type is a binary convolutional code (BCC) type.

12. The station of claim 11, wherein if the MFB type field indicates that the MFB is configured as a response to the MRQ of the AP, the feedback information does not include the coding information of the PPDU.

13. The station of claim 10, wherein the PPDU is a multi user (MU)-PPDU that carries at least one independent PLCP service data unit (PSDU) for at least one receiving station, the PPDU including a group ID indicating the at least one receiving station.

14. The station of claim 13, wherein the feedback information further includes a first field and a second field, and if the MFB type field indicates that the MFB is not configured as a response to the MRQ of the AP, the first field includes lowest 3 bits of the group ID and the second field includes highest 3 bits of the group ID.

15. The station of claim 14, wherein if the MFB type field indicates that the MFB is configured as a response to the MRQ of the AP, the first field includes a received value of MRQ sequence identifier (MSI) contained in the PPDU and the second field is reserved.

* * * * *